(12) United States Patent
Lissianski et al.

(10) Patent No.: US 7,531,153 B2
(45) Date of Patent: May 12, 2009

(54) METHODS AND APPARATUS FOR REMOVING MERCURY FROM COMBUSTION FLUE GAS

(75) Inventors: Vitali Victor Lissianski, San Juan Capistrano, CA (US); Peter Martin Maly, Lake Forest, CA (US); William Randall Seeker, San Clemente, CA (US)

(73) Assignee: General Electric Company, Schenectady, NY (US)

( * ) Notice: Subject to any disclaimer, the term of this patent is extended or adjusted under 35 U.S.C. 154(b) by 206 days.

(21) Appl. No.: 11/692,010

(22) Filed: Mar. 27, 2007

(65) Prior Publication Data

US 2008/0241029 A1    Oct. 2, 2008

(51) Int. Cl.
*B01D 53/64* (2006.01)
*F23J 11/00* (2006.01)
*F23J 15/00* (2006.01)

(52) U.S. Cl. .................. 423/210; 422/168; 110/203; 110/216; 110/233; 110/345

(58) Field of Classification Search .................. 423/210; 422/168; 110/203, 216, 233, 345
See application file for complete search history.

(56) References Cited

U.S. PATENT DOCUMENTS

| | | |
|---|---|---|
| 4,273,747 A | 6/1981 | Rasmussen |
| 4,724,130 A | 2/1988 | Statnick |
| 4,889,698 A | 12/1989 | Moller |
| 5,165,902 A | 11/1992 | Bortz |
| 5,507,238 A | 4/1996 | Knowles |
| 5,599,508 A | 2/1997 | Martinelli |
| 6,027,551 A | 2/2000 | Hwang et al. |
| 6,168,709 B1 | 1/2001 | Etter |
| 6,206,685 B1 | 3/2001 | Zamansky et al. |
| 6,280,695 B1 | 8/2001 | Lissianski et al. |
| 6,451,094 B1 | 9/2002 | Chang et al. |
| 6,471,506 B1 | 10/2002 | Zamansky et al. |
| 6,521,021 B1 | 2/2003 | Pennline |
| 6,595,147 B2 | 7/2003 | Teller et al. |
| 6,604,474 B2 | 8/2003 | Zamansky et al. |
| 6,694,900 B2 | 2/2004 | Lissianski et al. |
| 6,726,888 B2 | 4/2004 | Lanier et al. |
| 6,863,005 B2 | 3/2005 | Lanier et al. |
| 6,895,875 B1 | 5/2005 | Lissianski et al. |
| 6,981,456 B2 | 1/2006 | Lissianski et al. |

(Continued)

FOREIGN PATENT DOCUMENTS

JP        5031323 A    2/1993

*Primary Examiner*—Timothy C Vanoy
(74) *Attorney, Agent, or Firm*—Armstrong Teasdale LLP

(57) ABSTRACT

A method for reducing an amount of mercury in flue gases generated by the combustion of coal is provided. The method includes combusting a quantity of coal and a quantity of air within a primary combustion area such that a fly ash containing carbon and elemental mercury is formed within the flue gases, supplying air to the primary combustion area such that a portion of the air is channeled to an overfire air burnout area downstream from the primary combustion area to facilitate increasing an amount of the carbon content in the fly ash, cooling the flue gases to facilitate oxidizing the elemental mercury using the carbon content in the fly ash, and injecting sorbent into the flue gases to facilitate further reducing the amount of mercury in the flue gases.

20 Claims, 6 Drawing Sheets

U.S. PATENT DOCUMENTS

| | | |
|---|---|---|
| 2005/0036926 A1 | 2/2005 | Lissianski et al. |
| 2005/0106516 A1 | 5/2005 | Payne et al. |
| 2005/0129600 A1 | 6/2005 | Lanier et al. |
| 2005/0147549 A1 | 7/2005 | Lissianski et al. |
| 2005/0274307 A1 | 12/2005 | Lissianski et al. |
| 2006/0021554 A1 | 2/2006 | Lissianski et al. |
| 2006/0120934 A1 | 6/2006 | Lanier et al. |
| 2007/0116616 A1 | 5/2007 | Taylor |
| 2008/0011158 A1 | 1/2008 | Barger et al. |
| 2008/0241027 A1 * | 10/2008 | Lissianski et al. ............. 423/99 |

* cited by examiner

METHODS AND APPARATUS FOR REMOVING MERCURY FROM COMBUSTION FLUE GAS

BACKGROUND OF THE INVENTION

This invention relates generally to combustion devices and, more particularly, to emission control systems used to facilitate removing mercury from flue gases generated during coal combustion.

During a typical combustion process within a furnace or boiler, for example, a flow of combustion gases, or flue gases, is produced. Known combustion gases contain combustion products including, but not limited to, carbon, fly ash, carbon dioxide, carbon monoxide, water, hydrogen, nitrogen, sulfur, chlorine, and/or mercury.

Mercury, Hg, is a volatile metal that may be produced as an air pollutant during coal combustion. Mercury released from coal during combustion is readily aerosolized and can become airborne. Airborne mercury may travel globally prior to being deposited in soil and/or water. Mercury deposited in the environment is a persistent and toxic pollutant that may accumulate in the food chain. For example, mercury can be transformed within microorganisms into methylmercury, and the consumption of contaminated fish is a major route of human exposure to methylmercury. Methylmercury may be toxic to humans and may be associated with disorders of the nervous system, comas, heart disease, and death. Moreover, the adverse affects of methylmercury may be more serve in children and women of childbearing age.

Mercury emissions from coal-fired power plants are the subject of governmental regulation. The control of mercury emissions is complicated by the several forms mercury may take within combustion flue gases. For example, at combustion temperatures, mercury is present in flue gases in its elemental form, HgO, which may be difficult to control because elemental mercury is easily volatized and unreactive. Mercury reacts with carbon as flue gases cool below 1000° F., and such reactions may convert mercury to its highly reactive, oxidized form, Hg+2. Mercury may also be absorbed in fly ash and/or other flue gas particles to form particulate bound mercury, Hgp.

Since mercury can take several forms, known control technologies do not effectively control mercury emission for all coal types and for all combustion furnace configurations. Some known mercury control technologies take advantage of mercury's reactivity with carbon and use carbon as a mercury sorbent to form oxidized mercury. Carbon may be injected into mercury-containing flue gases in the form of activated carbon or may be formed in-situ during the combustion process as a result of incomplete coal combustion. Further, carbon in the presence of chlorine, Cl, may increase the oxidation of elemental mercury. In flue gases, mercury can be converted to its oxidized form, Hg+2, and react with chlorine-containing species to form mercuric chloride, HgCl2. As such, the extent of mercury oxidation in flue gases is generally higher for coals with a higher chlorine content, such as bituminous coals, and lower for coals with a lower chlorine content, such as low-rank coals.

Efficiencies of most available mercury emission control technologies depend on the mercury speciation in the flue gases. Oxidized mercury is water-soluble and may be removed from flue gas using known wet desulfurization systems (wet-scrubbers). At least some particulate bound mercury may be removed from flue gas using known particulate collection systems. Elemental mercury is more difficult to remove than oxidized mercury and/or particulate bound mercury because elemental mercury is unreactive and, as such, cannot be removed from flue gases with wet desulfurization systems or particulate collection system.

One known mercury control technology injects a sorbent, usually activated carbon, into the flow of flue gases to react with mercury therein. Because carbon is more reactive towards mercury at temperatures below 350° F., activated carbon is typically injected upstream from a particulate collection device, such as an electrostatic precipitator or a baghouse. Oxidized mercury is the most easily removable species of mercury and may be formed by injecting sorbent. As a result, the higher the fraction of oxidized mercury in flue gases, the higher the efficiency of mercury removal. Depending on the sorbent injection configuration and coal type, the efficiency of mercury removal ranges from 40% to 90% removal of mercury emissions. However, the cost of using activated carbon for mercury control may be expensive, and as such, mercury emission control may be affected by the cost associated with the removal.

Mercury may also be removed from flue gases by reacting with carbon in high-carbon fly ash formed in-situ in the combustion process. High-carbon fly ash is formed during the combustion of bituminous coals in coal reburning and air staging, and may be an effective mercury sorbent. Other coals, such as, for example, Powder River Basin (PRB) and lignite coals, are considered low-rank coals, and as such, represent a significant portion of the coal energy market. Such coals often have a low sulfur content that solves the problem of sulfur dioxide emissions, but may also have a low chlorine content. As such, the mercury in low-rank coals may not be oxidized because of a lack of chlorine and the presence of other constituents that tend to suppress mercury oxidation. As a result, mercury released during combustion is primarily elemental mercury. Moreover, because of the high reactivity of low-rank coals, fly ash from the combustion of such coals usually has a low carbon content. Coal reburning and air staging, which typically increases the carbon content in fly ash for bituminous coals, usually does not significantly increase the carbon-in-fly ash content for low-rank coals. As such, mercury removal through reactions with carbon-in-fly ash may not be effective because such fly ash does not have a sufficient amount of carbon with which the mercury can react.

BRIEF DESCRIPTION OF THE INVENTION

In one aspect, a method for reducing an amount of mercury in flue gases generated by the combustion of coal is provided. The method includes combusting a quantity of coal and a quantity of air within a primary combustion area such that a fly ash containing carbon and elemental mercury is formed within the flue gases, supplying air to the primary combustion area such that a portion of the air is channeled to an overfire air burnout area downstream from the primary combustion area to facilitate increasing an amount of the carbon content in the fly ash, cooling the flue gases to facilitate oxidizing the elemental mercury using the carbon content in the fly ash, and injecting sorbent into the flue gases to facilitate further reducing the amount of mercury in the flue gases.

In another aspect, a method for operating a coal-fired power plant is provided. The method includes injecting a quantity of coal and a quantity of air into a primary combustion area, combusting the coal and air such that a fly ash containing carbon and elemental mercury is formed within flue gases generated during the combustion process, supplying air to the primary combustion area such that a portion of the air is channeled to an overfire air burnout area downstream from the primary combustion area to facilitate increasing an amount of the carbon content in the fly ash, cooling the flue gases to facilitate oxidizing the elemental mercury within the convective pass using the carbon content in the fly ash, and injecting an amount of sorbent into the flue gases to facilitate further oxidation of mercury.

In a further aspect, a coal-fired combustion plant is provided. The combustion plant includes a furnace comprising a combustion zone for combusting coal and air received therein, such that flue gases formed during the combustion process contain carbon and elemental mercury, a convective pass coupled in flow communication to the furnace, the convective pass is configured to channel the flue gases therethrough, a coolant injector coupled to the convective pass, the injector configured to inject coolant into the convective pass to facilitate reducing a temperature of the flue gases, and a sorbent injector coupled to the convective pass, the sorbent injector configured to inject sorbent into the convective pass to facilitate oxidation of mercury.

DETAILED DESCRIPTION OF THE INVENTION

Figure 1:
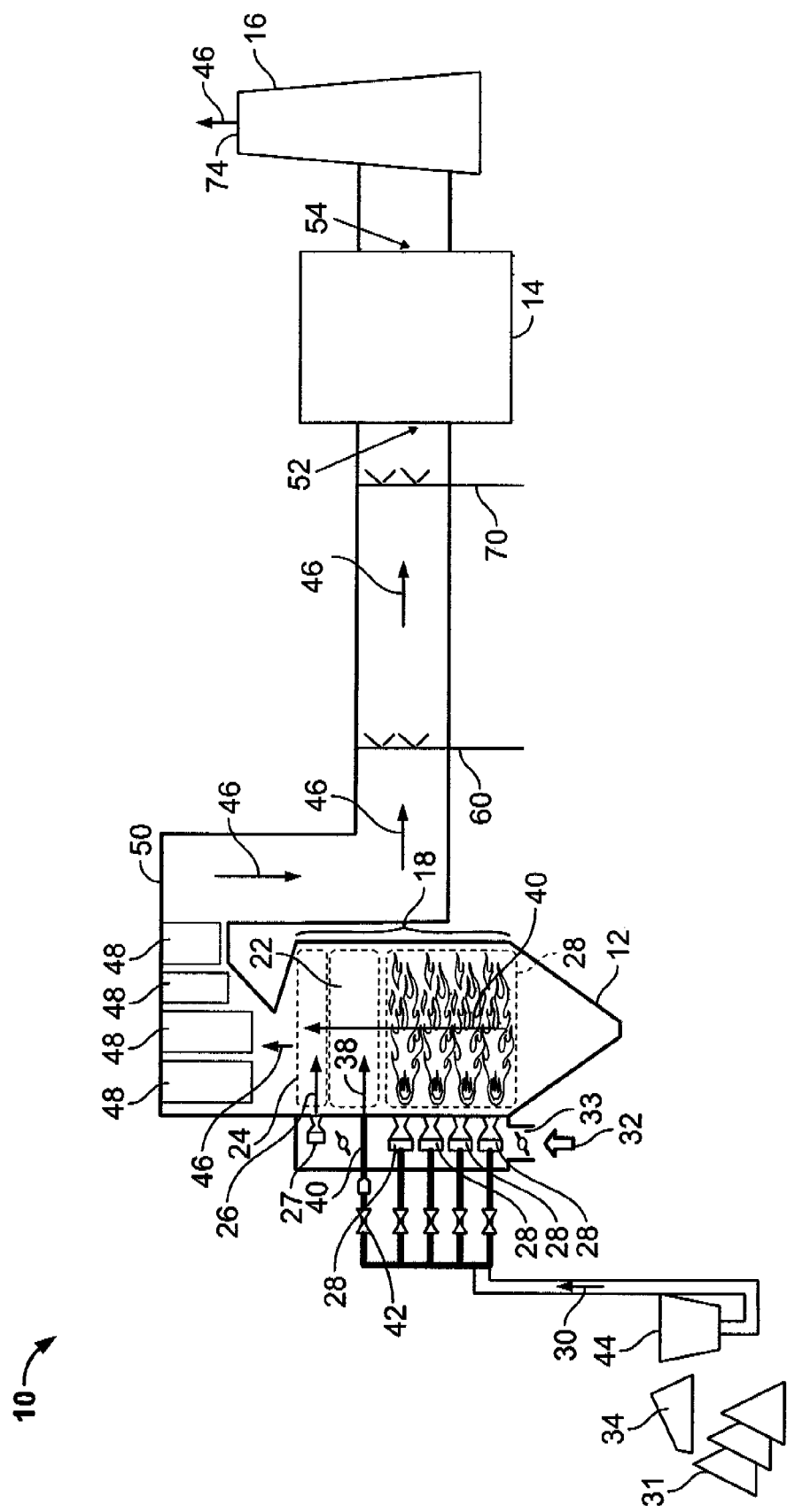
FIG. 1 is a schematic view of an exemplary power plant system.

FIG. 1 is a schematic view of an exemplary power generating system 10 that generally includes a furnace 12, a particle control device 14, and an exhaust stack 16. Specifically, in the exemplary embodiment, furnace 12 includes a combustion zone 18 that includes a primary combustion area 20, a reburning area 22, and an overfire air/burnout area 24. Alternatively, furnace 12 may be a "straight fire" furnace wherein combustion zone 18 does not include reburning area 22 and/or burnout area 24. Primary combustion area 20 may include a plurality of fuel injectors, or burners, 28 that are supplied with a pre-determined quantity of fuel 30 from a fuel inlet 44 and a pre-determined quantity of air 32 from an air inlet 33. An air-fuel controller (not shown) controls the amount of air 32 and the amount of fuel 30 supplied to burners 28. In the exemplary embodiment, fuel 30 may be in the form of coal 34 supplied from a fuel source 31, such as, but not limited to being, a coal mill. Specifically, in the exemplary embodiment, coal 34 is pulverized and may be, but is not limited to being, a bituminous coal, a Powder River Basin (PRB) coal, a lignite coal, any/or any other suitable coal that enables furnace 12 to function as described herein. Alternatively, fuel 30 supplied to system 10 may be any other suitable fuel, including but not limited to, oil, natural gas, biomass, waste, or any other fossil or renewable fuel that enables furnace 12 to function as described herein.

Moreover, as used herein, the term "controller" broadly refers to a processor, a computer, a microcontroller, a microcomputer, a programmable logic controller, an application specific integrated circuit, and any other programmable circuit. As used herein, the term "processor" may include any programmable system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "processor".

In the exemplary embodiment, reburning area 22 is downstream from primary combustion area 20 and receives a pre-determined quantity of reburn fuel 38 injected therein using a reburn fuel injector 40. In the exemplary embodiment, reburn fuel 38, such as coal 34, is supplied to reburn fuel injector 40 through a series of fuel shut off valves 42. Alternatively, reburn fuel injector 40 may receive fuel 30 from a source other than fuel source 31 and the fuel may be something other than coal 34. For example, in an alternative embodiment, reburn fuel 38 injected through injectors 40 may be any other suitable fuel, such as, but not limited to, oil, natural gas, biomass, waste, or any other fossil or renewable fuel. As described in more detail below, in the exemplary embodiment, the pre-determined quantity of reburn fuel 38 is injected into furnace 12 and is selected to achieve and/or maintain a desired air-to-fuel stoichiometric ratio within combustion zone 18. The stoichiometric ratio (SR) in the furnace is defined as the ratio of actual oxygen, $O_2$, to actual fuel 30 concentration in furnace 12, or the actual air-to-fuel ratio, divided by an oxygen-to-fuel concentration that results in substantially all of the oxygen and fuel being consumed, or the air-to-fuel ratio at stoichiometric conditions.

In the exemplary embodiment, burnout area 24 is downstream of reburning area 22, within combustion zone 18, and receives overfire air 26 injected therein from at least one overfire air injector 27. In the exemplary embodiment, overfire air injector 27 is coupled in flow communication with air inlet 33. More specifically, during operation a pre-determined quantity of overfire air 26 is injected into burnout zone 24 through injector 27. Alternatively, burnout area 24 may receive overfire air 26 from a different source than air inlet 33. The quantity of overfire air 26 supplied to area 24 is selected to facilitate achieving and/or maintaining a desired final system stoichiometric ratio within furnace 12.

System 10 also includes a plurality of heat exchangers 48 downstream from combustion zone 18. In the exemplary embodiment, heat exchangers 48 include a plurality of fuel cells (not shown) that may be electrically coupled to a power grid (not shown). A duct, or convective pass 50, extends downstream from heat exchangers 48 and is coupled in flow communication between furnace 12 and PCD 14. Moreover, in the exemplary embodiment, convective pass 50 includes a sorbent injector 60 and a coolant injector 70. Alternatively, convective pass 50 may only include coolant injector 70.

In the exemplary embodiment, particulate control device 14, in the exemplary embodiment, may be an electrostatic precipitator (ESP). Alternatively, PCD 14 may be a baghouse for collecting fly ash containing oxidized mercury and/or particulate-bound mercury. PCD 14 includes an inlet 52 and an outlet 54, and is coupled in flow communication with stack 16.

During operation of system 10, fuel 30 is supplied to system 10 from fuel source 31. In the exemplary embodiment, fuel 30 enters system 10 through fuel inlet 44 and air 32 is supplied to system 10 through air inlet 33. Primary combustion area 20 receives a pre-determined quantity of fuel and air, as controlled by the controller, for combustion using burners 28. Primary combustion area 20 ignites the fuel/air mixture which creates combustion or flue gases 46. In the exemplary embodiment, flue gases 46 are channeled downstream from primary combustion area 20 into reburning area 22. A pre-determined quantity of reburn fuel 38, controlled by the controller, is injected into reburning area 22 through reburning injectors 40. The amount of reburn fuel 38 is selected to create a fuel-rich environment in reburning area 22. As such, a smaller percentage of the carbon in reburn fuel 38 is combusted, which facilitates increasing, or optimizing, the loss-on-ignition (LOI) and facilitates creating a high-carbon content fly ash in flue gases 46. Mercury is more likely to oxidize in fly ash having a high-carbon content.

Flue gases 46 generated by system 10 are channeled downstream from reburning area 22 into burnout area 24. A pre-determined quantity of overfire air 26 is injected into burnout area 24 using burnout injector 27. In the exemplary embodiment, the quantity of overfire air 26 is selected to facilitate substantially completing the combustion of fuel 30 and reburn fuel 38, which facilitates reducing pollutants in flue gases 46, such as, but not limited to, nitrogen oxides, $NO_x$, and/or carbon monoxide, CO. More specifically, in the exemplary embodiment, the quantity of overfire air 26 injected is selected to facilitate preventing complete burnout of the carbon in the fly ash. As a result, system 10 generates flue gases 46 having between about 0.1% to about 0.4% carbon content in the fly ash. As described in more detail below, increasing an amount of carbon content within the fly ash facilitates increasing mercury capture by the fly ash.

In the exemplary embodiment, flue gases 46 exit combustion zone 18 and enter a plurality of heat exchangers 48. Heat exchangers 48 transfer heat from flue gases 46 to a fluid (not shown) to facilitate heating the fluid. In one embodiment, the heated fluid may generate steam that may be used to generate power using known power generation methods and systems such as, for example, a steam turbine (not shown). Alternatively, heat exchangers 48 may transfer heat from flue gases 46 to a fuel cell (not shown) used to generate power. The resulting power may be supplied to a power grid (not shown).

In the exemplary embodiment, flue gases 46 flow from heat exchangers 48 to a convective pass 50. While flue gases 46 flow through convective pass 50, flue gases 46 are cooled to a temperature that is less than a combustion temperature of flue gases 46. More specifically, in the exemplary embodiment, flue gases 46 within pass 50 are cooled convectively by ambient air, water, and/or any other suitable heat transfer fluid (not shown). In the exemplary embodiment, flue gases 46 are cooled to a temperature that enables mercury to react with the carbon in the fly ash, for example, but not limited to, a temperature below 350° F., to form oxidized mercury. Mercury may also react with elements and/or compounds within flue gases 46 to form particulate bound mercury.

In the exemplary embodiment, a sorbent injector 60 injects a pre-determined quantity of sorbent into convective pass 50. In the exemplary embodiment, the sorbent is activated carbon. Alternatively, the sorbent may be any other suitable element and/or compound. The sorbent is configured to react with any mercury present within flue gases 46. More specifically, in the exemplary embodiment, the sorbent is injected into convective pass 50 using sorbent injector 60. Alternatively, the sorbent is not injected to convective pass 50, and as such, the mercury in flue gases 46 reacts only with elements and/or compounds present within flue gases 46. In the exemplary embodiment, the sorbent facilitates a reaction between the sorbent and mercury present within the flue gases 46 to form mercury oxide and/or particulate-bound mercury.

A coolant injector 70 injects a pre-determined quantity of coolant into convective pass 50. As described in more detail below, the coolant facilitates reducing a temperature of the flue gases entering PCD 14, and thereby reduces the temperature of PCD 14. In the exemplary embodiment, the coolant is water which is atomized and injected into convective pass 50. Alternatively, the coolant may be ambient air. Specifically, in the exemplary embodiment, the coolant facilitates reducing the temperature of flue gases 46 and PCD 14 to between about 310° F. to about 250° F. In the exemplary embodiment, the reduced temperatures of flue gases 46 and PCD 14 facilitate a reaction between the mercury present within flue gases 46 and the fly ash. More specifically, reducing the temperature of flue gases 46 and PCD 14 facilitates improving a natural mercury capture on the fly ash. As a result, the amount of sorbent injected into convective pass 50 is facilitated to be reduced in comparison to a system that does not reduce the temperature of the flue gases and ESP.

In the exemplary embodiment, flue gases 46 and the sorbent flow through convective pass 50 to PCD 14. In an alternative embodiment, system 10 may also include an ash burnout unit (not shown) and/or a mercury collection unit (not shown) coupled to PCD 14. The ash burnout unit facilitates removing carbon from flue gases 46, which desorbs mercury from the fly ash. The mercury collection unit is coupled to the ash burnout unit and may include activated carbon, or any other suitable reagent, for capturing mercury desorbed by the burnout unit. System 10 may also include a wet scrubber (not shown) and/or a dry scrubber (not shown) downstream from PCD 14. Such a component removes oxidized mercury and/or particulate-bound mercury from flue gases 46 and/or other compounds and/or elements from flue gases 46, such as, for example, sulfur dioxide.

Exemplary tests were performed using a 1.0 MMBTU/hr Boiler Simulator Facility (BSF) (not shown) to determine the effects of coolant injection and combustion staging on mercury oxidation and removal. The following test results and the BSF in which the tests were conducted are exemplary only and are in no way limiting. The BSF was designed to provide an accurate sub-scale simulation of flue gas temperatures and compositions found in system 10. The BSF used during testing was configured to combust coal 34 and includes a burner, a vertically down-fired radiant furnace, a horizontal convective pass extending from the furnace, a baghouse and an ESP. The burner is a variable swirl diffusion burner with an axial fuel injector, and is used to simulate the approximate temperature and gas composition of a commercial burner in a full-scale boiler, such as, for example, system 10. Primary air is injected axially, and a secondary air stream is injected radially through swirl vanes to provide controlled fuel/air mixing. The swirl number can be controlled by adjusting the angle of the swirl vanes. Numerous access ports located along an axis of the facility allow access for supplementary equipment such as reburn injectors, additive injectors, overfire air injectors, and sampling probes. The radiant furnace is constructed of eight modular refractory lined sections with an inside diameter of twenty-two inches and a total height of twenty feet.

The convective pass of the BSF is refractory-lined, and contains air cooled tube bundles that simulate the superheater and reheater sections of a full-scale boiler, such as, for example, system 10. Heat extraction in the radiant furnace and the convective pass are controlled such that the residence time-temperature profile matches that of a typical full-scale boiler, such as, for example, system 10. A suction pyrometer is used to measure furnace gas temperatures.

The particulate control device for the BSF was a plate-type electrostatic precipitator including three electronic fields. Each electric field contained two gas passages having three parallel collecting panels. The gas passages had a width of about four inches. The specific collection area of the ESP was about 450 ft$^2$/1000 actual cubic feet per minute (ACFM). The flue gas treatment time within the ESP was about ten seconds. The mercury concentration was measured at an ESP inlet and an ESP outlet using a continuous emissions monitoring system (not shown) that is capable of measuring both elemental mercury and total mercury. The concentration of oxidized mercury is determined using the difference between total mercury and elemental mercury concentrations.

Exemplary tests were conducted with and without air staging in the BSF. More specifically, in the exemplary embodiment, tests with PRB coal were conducted at baseline and overfire air staging conditions. Moreover, in testing with air staging, the SR was set to between about 1.16 and about 0.7, which represents a fuel-lean environment and a fuel-rich environment, respectively. In baseline tests all the fuel and air were injected into a combustion zone without any air staging. In the exemplary embodiment, the SR of baseline tests was about 1.16, which corresponds to about 3.2% excess $O_2$, or a fuel-lean environment. In overfire air tests, however, part of the combustion air was injected downstream of the combustion zone such that fuel combustion occurred in a fuel-rich environment. Final excess $O_2$ in overfire air tests was the same as in the baseline tests, although in some tests it varied from about 2.2% to about 4.2% excess °2. Combustion stoichiometric ratio (SRI) in primary combustion area and the reburn area was varied from 0.7 to 1.16 by adjusting the combustion air flow rate through the burner. Final system stoichiometric ratio (SR2) was maintained by adjusting the overfire air flow rate.

Figure 2:
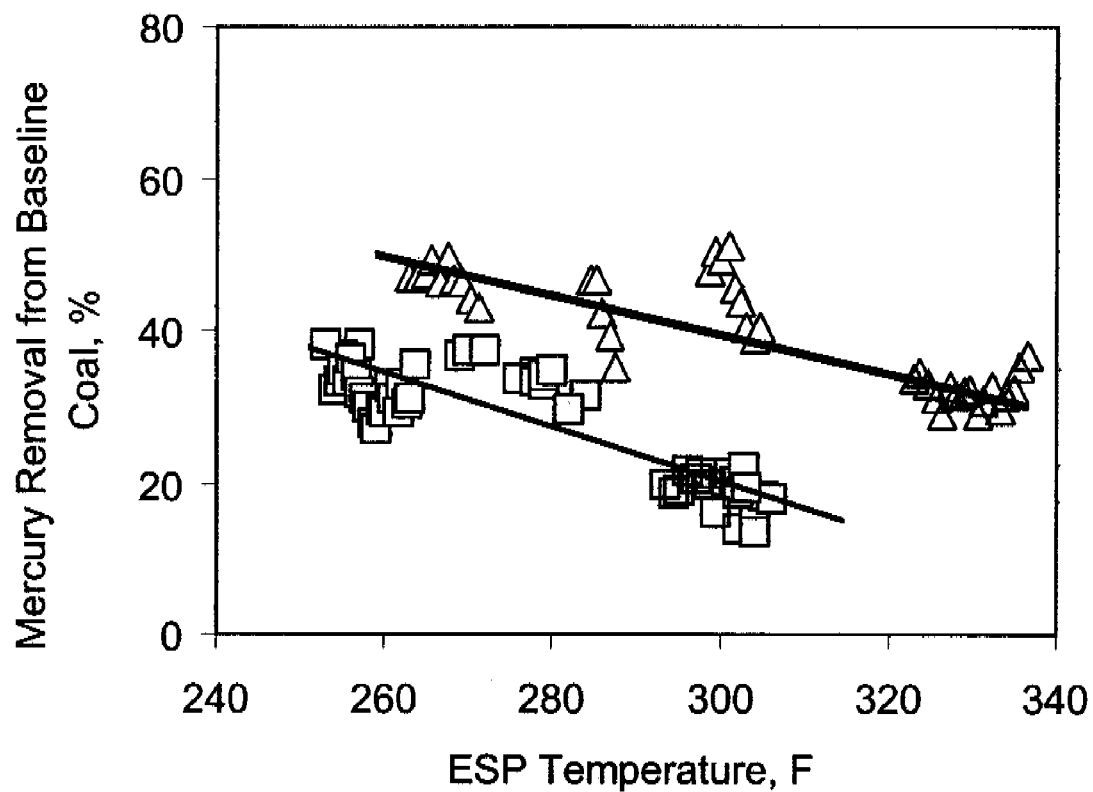
FIG. 2 is a graphical representation illustrating exemplary effects of air staging combustion and temperature of an electrostatic precipitator (ESP) on mercury oxidation.

FIG. 2 shows exemplary effects of electrostatic precipitator (ESP) temperature and air staging combustion on the removal of mercury from flue gases generated during coal combustion. More specifically, in the exemplary embodiment, FIG. 2 shows that mercury removal generally improved with a decrease in ESP temperature. To determine any amount of mercury removal, the total amount of mercury introduced by the coal into the furnace was first calculated using a coal feed rate and by determining the mercury content in the coal. The coal feed rate is the amount of coal per unit of time that is supplied to the combustor. The mercury removal was then determined as the difference between the mercury introduced within the coal and the mercury measured in the flue gases at the ESP outlet. Specifically FIG. 2 provides a graphical representation of exemplary effects of baseline and overfire air staging and ESP temperature on the removal of mercury which has oxidized on the surface of the fly ash. The removal of mercury using baseline conditions, or straight firing, is represented with squares and the removal of mercury using overfire air staging is represented with triangles.

In the exemplary embodiment, coolant water was injected into the convective pass of the BSF, to reduce the temperature of the flue gases and the PCD. Referring to FIG. 2, the mercury removal at baseline conditions and ESP temperatures between about 300° F. to about 310° F. for systems burning PBR coal was about 15% to about 20%. Moreover, FIG. 2 provides that mercury removal improved, as the temperature of the ESP was reduced. Specifically, in the exemplary embodiment, reducing the ESP temperature from about 310° F. to about 250° F., increased the mercury removal to between about 30% and about 40%. Furthermore, FIG. 2 also illustrates that the mercury removal using overfire air staging and ESP temperatures between about 320° F. and about 260° F., improved mercury removal between about 15% to about 20% over baseline conditions. Specifically, in one embodiment, using overfire air staging and with the ESP temperature of about 260° F., the mercury removal was about 50%.

Figure 3:
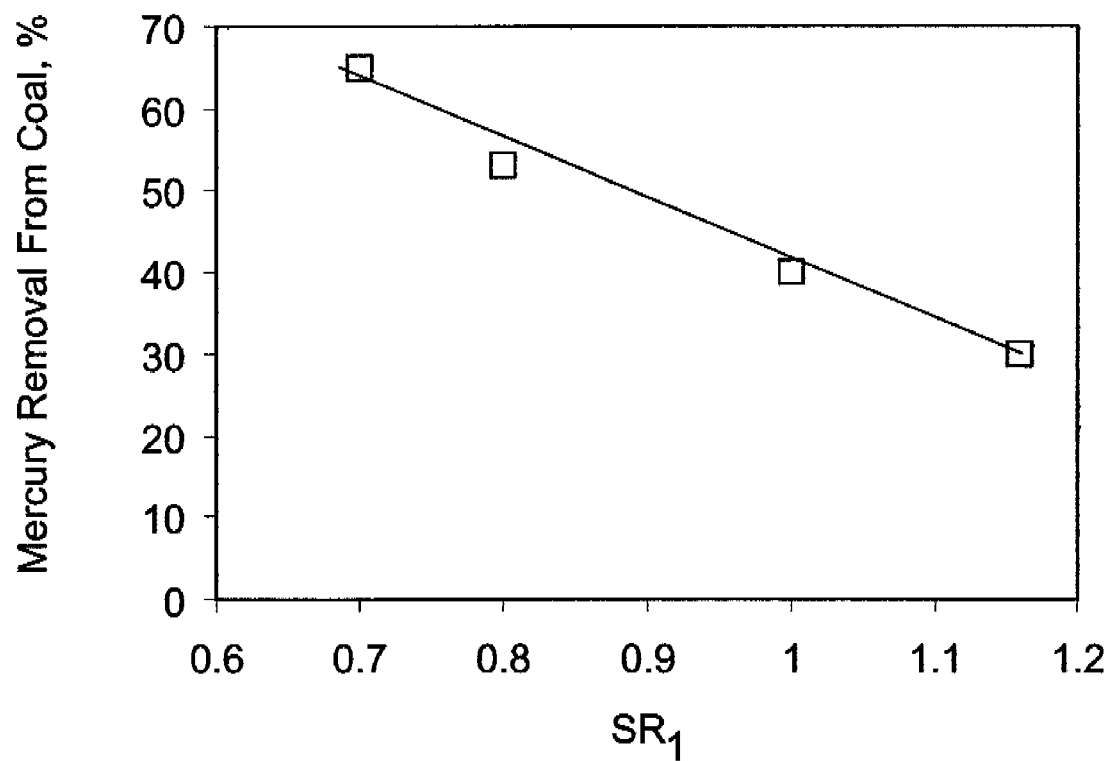
FIG. 3 is a graphical representation illustrating exemplary effects of an air-to-fuel stoichiometric ratio on mercury removal within an ESP operating at a temperature of about 270F.

FIG. 3 illustrates the effects of SR on mercury removal. Specifically, FIG. 3 illustrates exemplary effects of SR on mercury removal using an ESP temperature of about 270° F. In the exemplary embodiment, mercury removal using reduced ESP temperatures can be further improved by varying the SR in the combustion zone. In the exemplary embodiment, an SR of about 1.16 generally corresponds to baseline combustion conditions wherein substantially all of the air is directed to the combustion zone. A SR less than about 1.16 generally represents overfire air staging. In the exemplary embodiment, generally the lower the SR, the more combustion air is diverted from the primary combustion area to the overfire air burnout area. FIG. 3 shows that in one embodiment, reducing the SR from about 1.16% to about 0.7%, increased the mercury removal from about 30% to about 65%, respectively. As such, the percentage of mercury that may be removed from flue gases is increased when more fuel-rich SRs are used.

Figure 4:
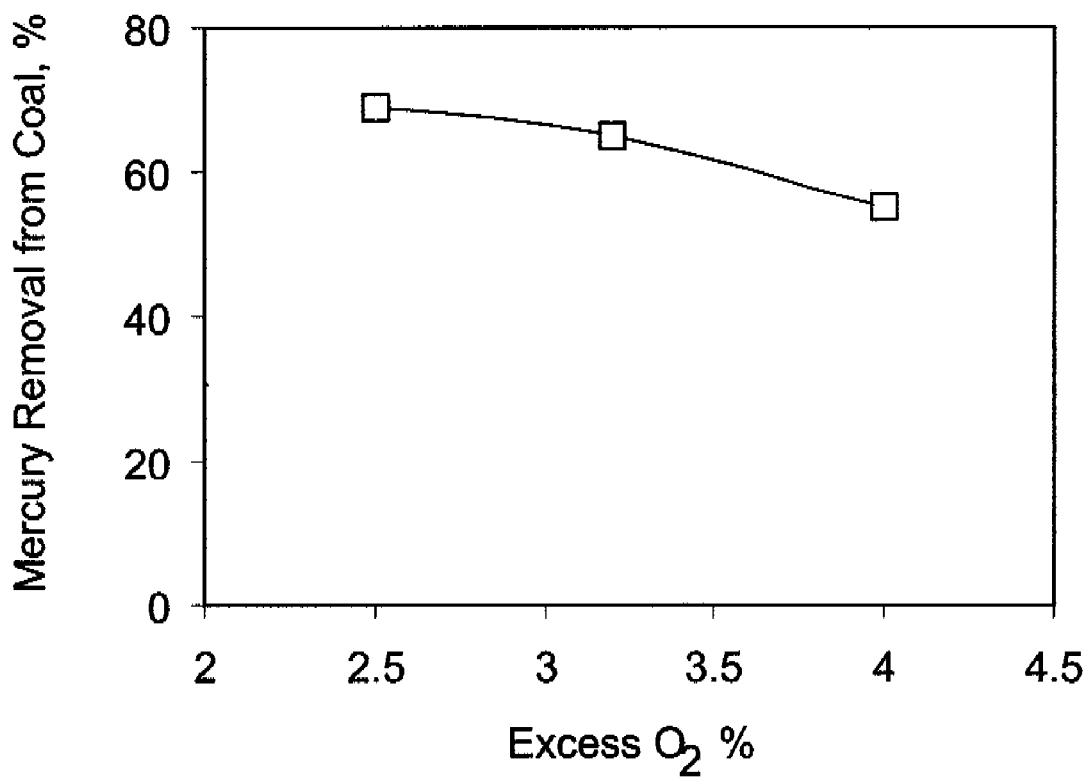
FIG. 4 is a graphical representation illustrating exemplary effects of excess $O_2$ on mercury oxidation.

FIG. 4 illustrates exemplary effects of final excess $O_2$ on mercury removal under air-staging conditions. During testing, excess $O_2$ was adjusted by changing the amount of overfire air, while maintaining the SR. As shown in FIG. 4, generally a decrease in excess $O_2$ improves mercury removal. This improvement is most likely due to the increase in carbon content within the ash content. As described above, this is also known as LOI. The increase in carbon content within the fly ash enables the ash to become a more effective mercury sorbent. Moreover, the combination of the increased fly ash carbon content and the reduced ESP temperature, facilitates increasing the reactivity of carbon with mercury. As a result, generally the removal of mercury increases, as excess $O_2$ is decreased. Therefore, the required amount of sorbent injected into the convective pass is facilitated to be decreased in comparison to systems that decrease the amount of excess $O_2$.

Figure 5:
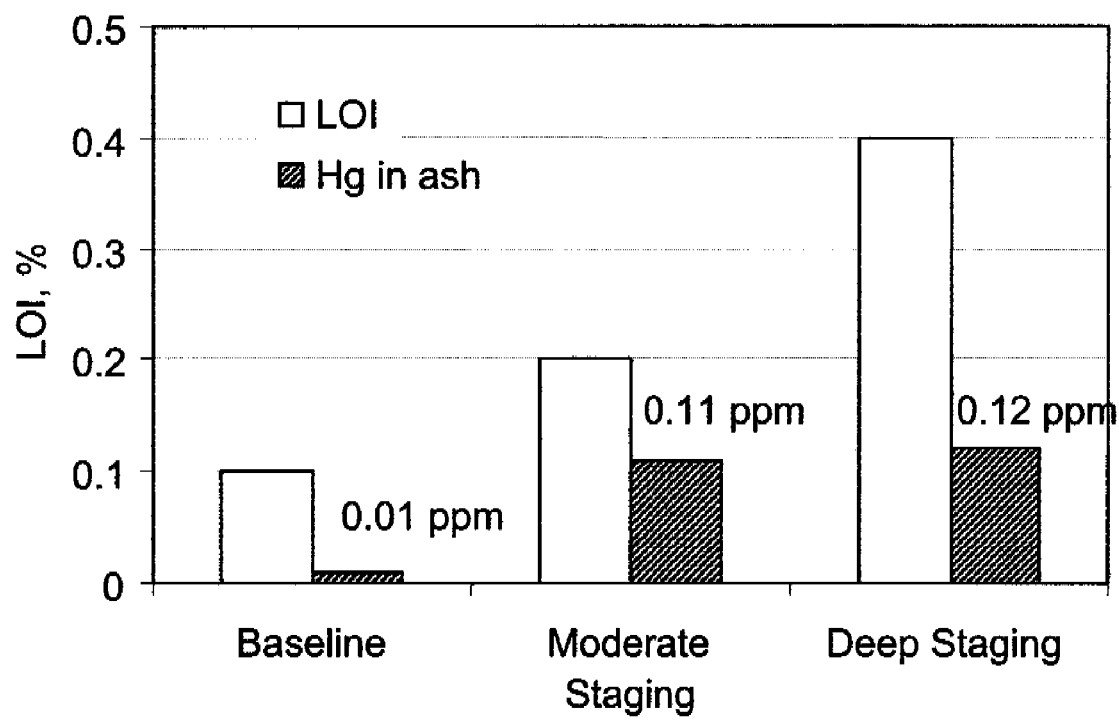
FIG. 5 is a graphical representation illustrating exemplary effects of an increase of carbon content within the fly ash, or loss-on-ignition, on mercury oxidation.

FIG. 5 illustrates that an increase in carbon content, or LOI, within the fly ash facilitates the removal of mercury from the flue gases. Specifically, FIG. 5 illustrates the increase of mercury content in the fly ash, due to mercury reacting with the carbon in the fly ash, was associated with an increase in carbon content, or LOI.

Figure 6:
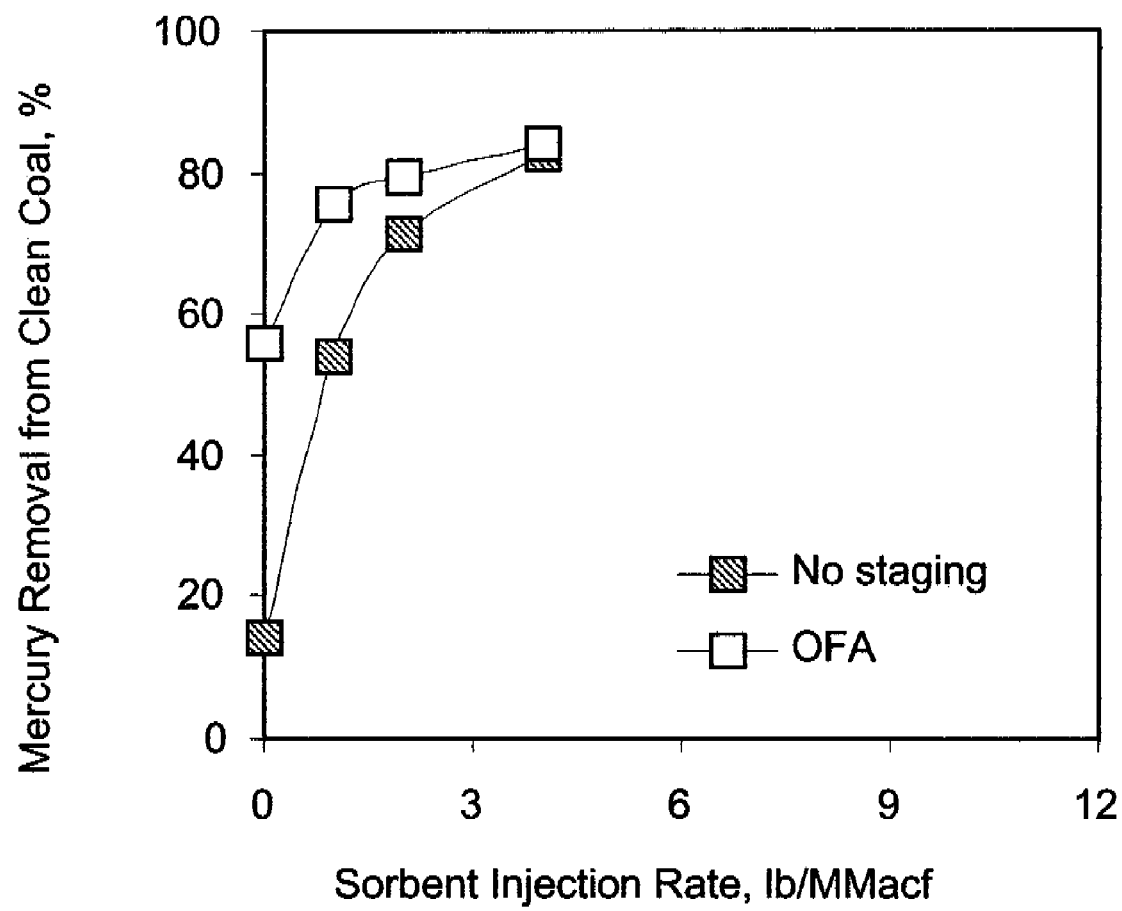
FIG. 6 is a graphical representation illustrating exemplary effects of air staging combustion and sorbent injection on mercury oxidation.

FIG. 6 illustrates the combined exemplary effect of overfire air staging and sorbent injection on mercury removal for a furnace that had an SR substantially equal to 0.9 and an electrostatic precipitator that had a temperature of about 300° F. Generally, a decrease in the SR during air staging combustion, increases the carbon content of the fly ash, which subsequently increases the removal of mercury. As a result, the fly ash acts as a natural sorbent of mercury. When activated sorbent was also used to remove mercury, less activated sorbent was required to achieve similar results if no staging were used. Furthermore, when the temperature of the flue gases and ESP were reduced using a coolant injection system, the natural mercury removal by the fly ash was further increased. FIG. 6 also illustrates that an improvement of natural mercury removal from the fly ash decreased requirements for activated sorbent injection. For example, in FIG. 6, for 70% mercury removal, an integration of activated carbon injection with overfire air staging resulted in reduction of sorbent injection rate for PRB coal from about 2 pounds per million actual cubic feet ("lb/MMacf") of flue gases to about 0.75 lb/MMacf. As a result, the natural mercury removal on the fly ash facilitated a 60% reduction in sorbent requirements.

The above-described methods and apparatus facilitate reducing mercury from combustion exhaust gases by improving natural mercury capture on fly ash and improving sorbent utilization. Reducing the temperature of the flue gases and the electrostatic precipitator by injecting a coolant into a convective pass, facilitates increasing the natural absorption of mercury in the fly ash as compared with furnaces that combust coal with a higher flue gas and ESP temperatures. Furthermore, optimizing the amount of carbon within the fly ash using combustion staging technologies, such as, for example, coal reburning and air staging, facilitates increasing the fuel-to-air ratio within the combustion zone, and this facilitates increasing the natural removal of mercury from the flue gas. As such, pollutants, such as, but not limited to, mercury, have more carbon available to react with within the flue gases. Moreover, in power plants using sorbent injection, the amount of sorbent injected is decreased when the natural absorption of mercury by the fly ash increases. Since carbon in ash may be an effective mercury sorbent formed in-situ, reducing the temperature of the flue gases and the ESP, facilitates optimizing the carbon content in the fly ash, facilitates reducing the amount of sorbent injected, and facilitates reducing the overall costs of system operation.

Exemplary embodiments of methods and apparatus for removing mercury from combustion exhaust gas are described above in detail. The methods and apparatus are not limited to the specific embodiments described herein, but rather, components of the methods and apparatus may be utilized independently and separately from other components described herein. For example, reducing the ESP temperature and optimizing the carbon content in the fly ash may also be used in combination with other pollution control systems and methods, and is not limited to practice with only the coal-fired power plant as described herein. Rather, the present invention can be implemented and utilized in connection with many other pollutant emission reduction applications.

While the invention has been described in terms of various specific embodiments, those skilled in the art will recognize that the invention can be practiced with modification within the spirit and scope of the claims.

What is claimed is:

1. A method for reducing an amount of mercury in flue gases generated by the combustion of coal, said method comprising:
    combusting a quantity of coal and a quantity of air within a primary combustion area such that a fly ash containing carbon and elemental mercury is formed within the flue gases;
    supplying air to the primary combustion area such that a portion of the air is channeled to an overfire air burnout area downstream from the primary combustion area to facilitate increasing an amount of the carbon content in the fly ash;
    cooling the flue gases to facilitate oxidizing the elemental mercury using the carbon content in the fly ash; and
    injecting sorbent into the flue gases to facilitate further reducing the amount of mercury in the flue gases.

2. A method in accordance with claim 1 further comprising removing the sorbent and the fly ash containing absorbed oxidized mercury using a particulate control device downstream from the overfire air burnout area.

3. A method in accordance with claim 1 further comprising supplying an amount of air to the overfire air burnout area to increase the carbon content in the flue gases to between about 0.1% and about 0.4%.

4. A method in accordance with claim 1 wherein cooling the flue gases comprises injecting a coolant into the flue gases.

5. A method in accordance with claim 1 wherein cooling the flue gases comprises injecting one of water and air into the flue gases to facilitate lowering the temperature of the flue gases.

6. A method in accordance with claim 2 wherein cooling the flue gases comprises cooling the flue gases and the particulate control device to a temperature below about 350° F.

7. A method in accordance with claim 2 wherein cooling the flue gases comprises cooling the flue gases and the particulate control device to a temperature between about 310° F. and about 250° F.

8. A method for operating a coal-fired power plant, said method comprising:
    injecting a quantity of coal and a quantity of air into a primary combustion area;
    combusting the coal and air such that a fly ash containing carbon and elemental mercury is formed within flue gases generated during the combustion process;
    supplying air to the primary combustion area such that a portion of the air is channeled to an overfire air burnout area downstream from the primary combustion area to facilitate increasing an amount of the carbon content in the fly ash;
    cooling the flue gases to facilitate oxidizing the elemental mercury within the convective pass using the carbon content in the fly ash; and
    injecting an amount of sorbent into the flue gases to facilitate further oxidation of mercury.

9. A method in accordance with claim 8 further comprising removing the sorbent and fly ash containing absorbed oxidized mercury using a particulate control device downstream of the convective pass.

10. A method in accordance with claim 8 wherein cooling the flue gases comprises injecting a coolant into a convective pass to facilitate reducing the temperature of the flue gases.

11. A method in accordance with claim 8 wherein cooling the flue gases comprises injecting one of water and air into a convective pass to facilitate reducing the temperature of the flue gases.

12. A method in accordance with claim 9 wherein cooling the flue gases comprises cooling the flue gases to a temperature of between about 310° F. to about 250° F.

13. A method in accordance with claim 9 wherein supplying air to the primary combustion area further comprises supplying air to increase carbon content in the flue gas to between about 0.1% and about 0.4%.

14. A method in accordance with claim 9 wherein cooling the flue gases temperature facilitates optimizing the amount of sorbent injected into the convective pass.

15. A coal-fired combustion plant comprising:
    a furnace comprising a combustion zone for combusting coal and air received therein, such that flue gases formed during the combustion process contain carbon and elemental mercury;
    an overfire air burnout area downstream from said combustion zone such that a portion of the air received in said combustion zone is channeled to said overfire air burnout area;
    a convective pass coupled in flow communication to said furnace, said convective pass is configured to channel the flue gases therethrough;

a coolant injector coupled to said convective pass, said iinjector configured to inject coolant into said convection pass to faciltate reducing a temperature of the flue gases; and a sorbent injector coupled to said convective pass, to facilitate oxidation of mercury.

16. A coal-fired combustion plant in accordance with claim 15 wherein said furnace is configured to combust coal and air such that flue gases are formed having a carbon content between about 0.1% and about 0.4%.

17. A coal-fired combustion plant in accordance with claim 15 wherein said coolant injector is configured to inject coolant into said convective pass to facilitate reducing the temperature of the flue gases to between about 310° F. and about 250° F.

18. A coal-fired combustion plant in accordance with claim 15 wherein said coolant injector is further configured to inject one of water and air into said convective pass to facilitate reducing the temperature of the flue gases.

19. A coal-fired combustion plant in accordance with claim 15 wherein said coolant injector facilitates increasing the absorption of elemental mercury by the carbon content within the flue gases.

20. A coal-fired combustion plant in accordance with claim 15 wherein said coolant injector facilitates optimizing the amount of sorbent injected into said convective pass.

* * * * *

UNITED STATES PATENT AND TRADEMARK OFFICE
CERTIFICATE OF CORRECTION

| | | |
|---|---|---|
| PATENT NO. | : 7,531,153 B2 | Page 1 of 1 |
| APPLICATION NO. | : 11/692010 | |
| DATED | : May 12, 2009 | |
| INVENTOR(S) | : Lissianski et al. | |

It is certified that error appears in the above-identified patent and that said Letters Patent is hereby corrected as shown below:

In Claim 13, column 10, line 48, delete "gas to" and insert therefor --gases to--.
In Claim 15, column 11, line 2, delete "iinjector" and insert therefor --injector--.
In Claim 15, column 11, beginning on line 2, delete "convection" and insert therefor --convective--.
In Claim 15, column 11, line 3, delete "faciltate" and insert therefor --facilitate--.
In Claim 15, column 11, line 5, between "pass," and "to" insert --said sorbent injector configured to inject sorbent into said convective pass--.

Signed and Sealed this

Fourteenth Day of July, 2009

JOHN DOLL
*Acting Director of the United States Patent and Trademark Office*